United States Patent [19]
Margetts

[11] 3,835,964
[45] Sept. 17, 1974

[54] SHOE-DRUM BRAKES

[75] Inventor: Hugh Grenville Margetts, Leamington Spa, England

[73] Assignee: Girling Limited, Birmingham, England

[22] Filed: Oct. 26, 1972

[21] Appl. No.: 301,058

[30] Foreign Application Priority Data
Oct. 28, 1971 Great Britain................. 50062/71
Oct. 28, 1971 Great Britain................. 50063/71

[52] U.S. Cl. .................... 188/79.5 GT, 188/196 BA
[51] Int. Cl. ............................................. F16d 65/58
[58] Field of Search... 188/79.5 P, 79.5 K, 79.5 GT, 188/196 B, 196 BA

[56] References Cited
UNITED STATES PATENTS
3,095,065  6/1963  Troy............................ 188/79.5 GT
3,249,182  5/1966  O'Reilly................... 188/79.5 GT X FOREIGN PATENTS OR APPLICATIONS
672,350  9/1929  France........................ 188/79.5 GT Primary Examiner—Duane A. Reger
Attorney, Agent, or Firm—Scrivener, Parker, Scrivener & Clarke

[57] ABSTRACT

An adjuster for internal shoe drum brakes includes a dished pressing rotatably mounted on the back-plate of the brake, the side wall of the pressing providing a cam surface engaging with a pin extending from a shoe and the periphery of the pressing providing ratchet teeth engaging with a pawl movable with the shoe.

8 Claims, 6 Drawing Figures

PATENTED SEP 17 1974
3,835,964
SHEET 1 OF 2
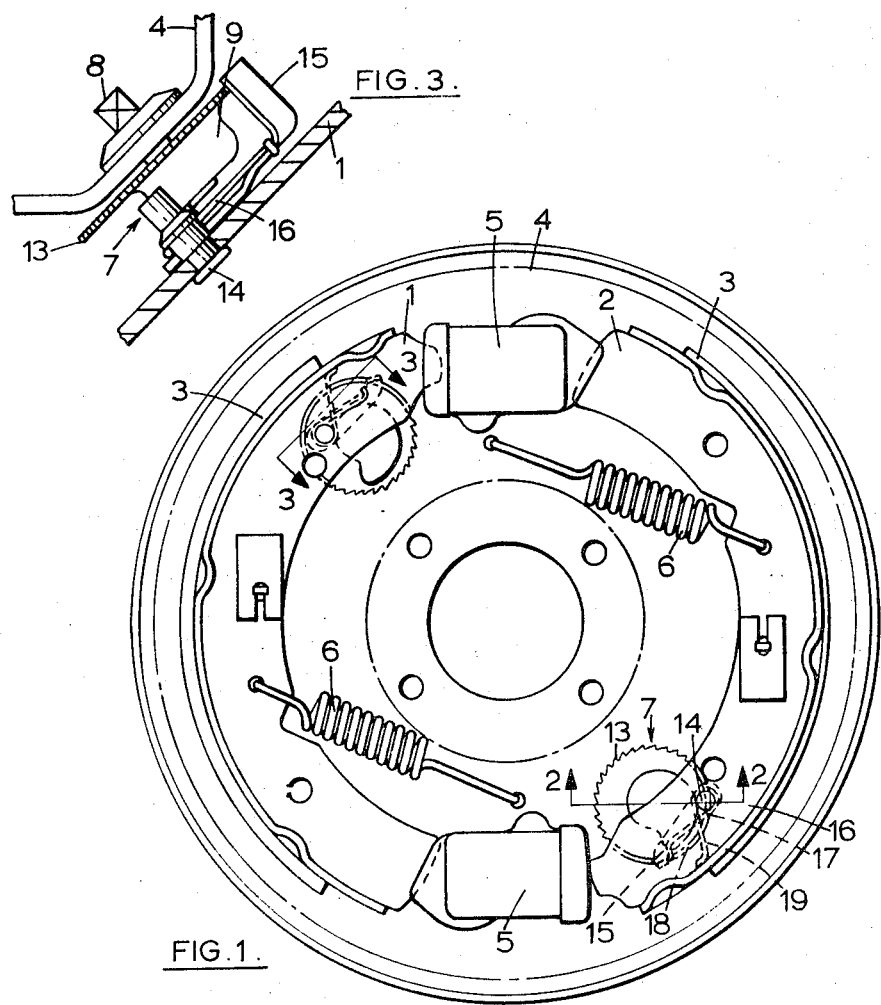
FIG. 3.
FIG. 1.
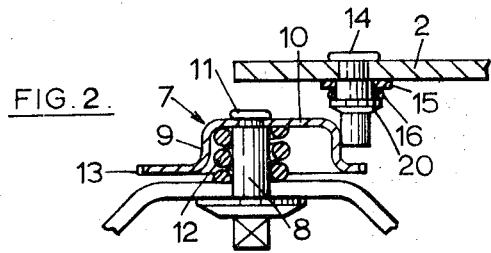
FIG. 2.

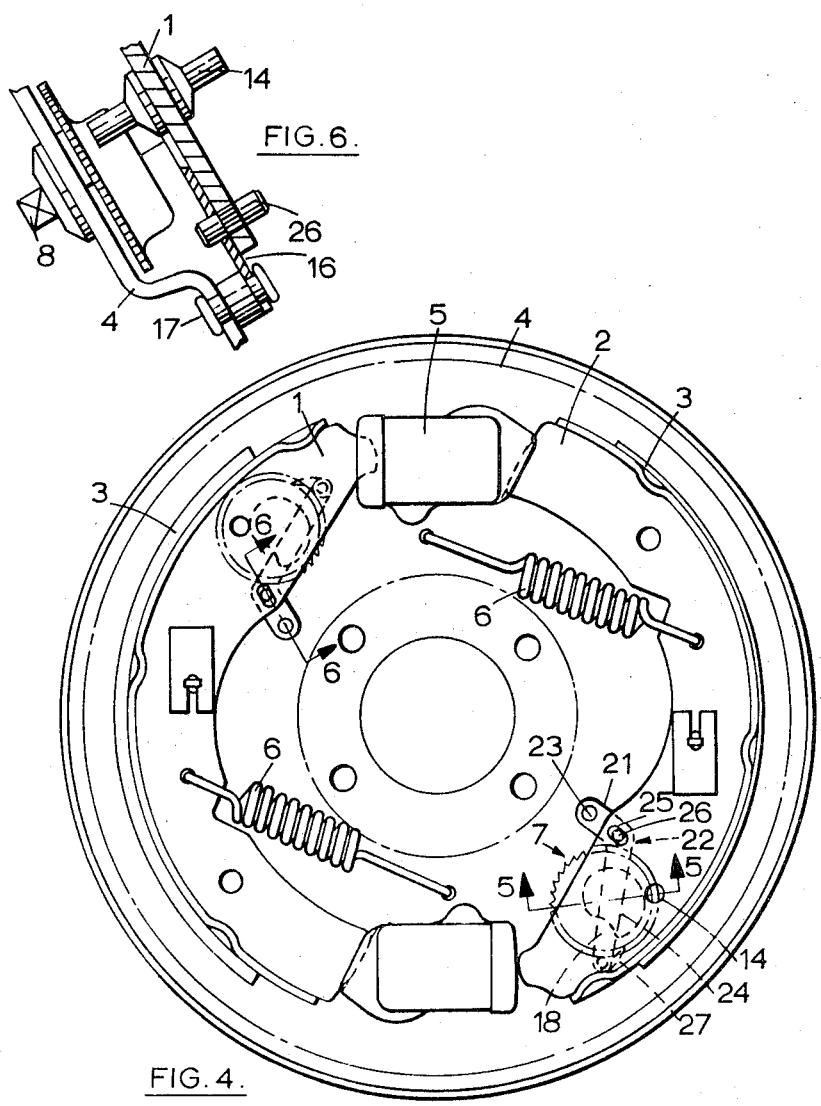
FIG. 6.
FIG. 4.
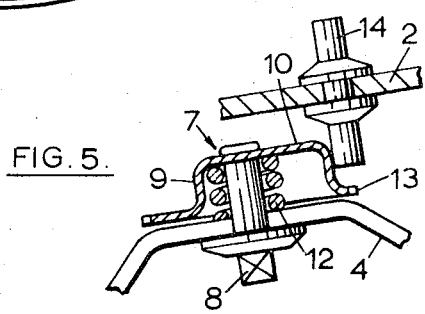
FIG. 5.

SHOE-DRUM BRAKES

This invention relates to adjusters for internal shoe-drum brakes of the kind in which arcuate shoes mounted on a stationary back-plate are adapted to be separated to bring them into engagement with a rotatable drum.

According to this invention an adjuster for an internal shoe-drum brake of the kind set forth comprises a one-piece cam member adapted to be rotatably mounted on the back-plate, a surface portion of the member forming a cam surface adapted to bear on a shoe and another portion of the member being formed with ratchet teeth, and a pawl movable with the shoe and co-operating with the ratchet teeth for rotating the cam member when relative movement between the shoe and cam member exceeds a predetermined amount upon application of the shoe against the drum.

The ratchet teeth may be formed on a peripheral portion of the cam member.

Preferably the cam member is a dished pressing, the side wall of the dish forming the cam surface and the periphery being toothed.

A spring may be fitted around the pivot for the dished member to act between the base of the dish and the back-plate.

Preferably the cam surface co-operates with a pin extending from the web of the shoe towards the back-plate so that the adjuster is contained in the space between the web and the back-plate.

In one preferred embodiment of an adjuster according to this invention the pawl is carried by a lever pivotally mounted on the pin extending from the shoe web.

In a second preferred embodiment the pawl is carried by a lever pivotally mounted on the back-plate of the brake and a pin on the web of the shoe extends through a slot in the lever.

An adjuster according to this invention may be conveniently used with a shoe-drum brake of the two-leading shoe type, the adjuster being located adjacent the actuated end of each shoe.

Two embodiments of this invention are illustrated by way of examples in the accompanying drawings, in which:

FIG. 1 is an end view of a brake, each shoe being fitted with one embodiment of an adjuster according to the invention;

FIG. 2 is a section on the lines 2—2 of FIG. 1;

FIG. 3 is a section on the lines 3—3 of FIG. 1;

FIG. 4 is an end view of a brake, fitted with a second embodiment of the adjuster;

FIG. 5 is a section on the lines 5—5 of FIG. 4; and

FIG. 6 is a section on the lines 6—6 of FIG. 4.

In the front brake illustrated in FIGS. 1–3 which is of the two-leading shoes type, two arcuate brakes shoes 1, 2 carrying friction linings 3 are located within a rotatable drum (not shown) and are mounted on a stationary back-plate 4. One end of each shoe is movable towards the drum by an hydraulic actuator 5 and is biassed in the opposite direction by a spring 6.

Each shoe is provided adjacent its operative end with its own adjuster which includes a dished cam member 7 securely mounted on a pin 8 rotatably mounted on the back-plate 4. The dished member 7 is a pressing, the side wall 9 of the dish forming a cam surface and the mouth of the dish being adjacent the back-plate 4. The pin 8 passes through an opening in the base 10 of the dish and has a head 11 rivetted securely over the base 10. A spring 12 is located around the pin 8 and acts between the base 10 and the back-plate 4 to provide some resistance to the rotation of member 7. The periphery of the dished pressing 7 is circular and provided with ratchet teeth 13. A pin 14 secured to the web of shoe 2 and projecting towards the back-plate 4 is urged against the cam surface 9 by the return spring 6. A pawl lever 15 is pivotally mounted on pin 14 and extends chordally across the member 7 to co-operate with the ratchet teeth 13 adjacent the operated end of the shoe 2. The lever 15 lies against the inner surface of the shoe web but is cranked inwardly at its free end, forming a pawl to engage the ratchet teeth 13. The pawl is held in contact with the ratchet teeth 13 by a spring 16 which is a length of spring wire bent to the form of a loop 17 with the limbs 18, 19 crossing. The loop 17 encircles the pin 14 and is held against the pawl lever 15 by a shoulder 20 on the pin 14, one limb 18 of the spring engaging the cranked end of the pawl lever and the other limb 19 bearing against the rim of the shoe 2.

The adjuster for shoe 1 is identical and the equivalent parts are given the same reference numerals. The lining 3 of the shoe 2 is shown in a worn condition with the adjuster almost fully extended whereas the lining 3 of shoe 1 is new and the adjuster unextended.

When the brake is operated and the end of shoe 2, for instance, is moved towards the drum by the actuator 5, pin 14 is caused to move away from the cam surface 9 until the lining 3 contacts the drum. Movement of pin 14 carries pawl lever 15 towards the steep face of a ratchet tooth 13. When the movement becomes excessive due to lining wear, the pawl will engage a ratchet tooth 13 and rotate the cam member 7 slightly. On the shoe returning the pawl will ride over the next tooth. On the next brake operation the pawl will rotate the member 7 by the pitch of one tooth. When the shoe 2 returns a second time, the pin 14 will bear against the rotated cam surface 9 and will not allow the shoe to return to its initial position. Therefore the clearance between the lining 3 and the drum depends on the pitch of the ratchet teeth 13.

On the remote side of the back-plate pin 8 has a square head for engagement with an adjusting tool. Also the back-plate is provided with an opening (not shown) through which the pawl lever 15 can be lifted off the ratchet teeth 13. By these means the adjuster can be reset.

The brake illustrated in FIGS. 4–6 is identical with that of FIGS. 1–3 and the same reference numberals have been used in all the drawings. Also the dished member of the adjuster shown in FIGS. 4–6 is the same as that shown in FIGS. 1–3 and the same reference numerals have been used for equivalent features. However in this second embodiment of the adjuster the arrangement of the pawl lever has been modified.

The end of the short arm 21 of a substantially L-shaped lever 22 is pivoted on a pin 23 secured to the back-plate 4 on the side of member 7 remote from actuator 5. Substantially at the junction of the short arm 21 with the long arm 24 of the lever 22 there is an elongated slot 25 whose axis is aligned with the axis of the short arm 21. A pin 26 projecting from the web of shoe 2 towards the back-plate 4 is received in slot 25 which is of greater axial length than the diameter of pin 26. The long arm 24 of lever 22 extends across cam member 7 and on its end carries a pawl 27 which is adapted to engage ratchet teeth 13. The pawl 27 may be spring-biassed into engagement.

The adjuster for shoe 1 is identical. The lining 3 of shoe 2 is shown in a worn condition with the adjuster almost fully extended whereas the lining 3 of shoe 1 is new and the adjuster unextended.

When the brake is operated and the end of shoe 2, for instance, is moved towards the drum by actuator 5, pin 26 moves with the shoe and takes up the clearance in slot 25. When the movement becomes excessive due to lining wear, the pin 26 moves lever 22 which multiplies the movement and transmits it to the pawl 27 which rotates the dished member 7 slightly. On the shoe returning, the pawl 27 will ride over the next ratchet tooth. On the next brake operation the pawl 27 will rotate the member 7 by the pitch of one tooth. When the shoe 2 returns a second time, the pin 14 will bear against the rotated cam 9 and will not allow the shoe to return to its initial position.

Therefore adjustments in the clearance between lining and drum take place in increments which can be made very small, their size depending on the pitch of the ratchet teeth 13, the ratio of the effective lengths of arms 21, 24 of lever 22 and the profile of the cam surface 9. The L-shaped lever 22 provides the correct line of action of the pin 26 in the slot 25 while requiring a minimum of material to provide lever ratio.

It will be appreciated that the adjusters described maintain a substantially constant clearance between lining and drum and can be used with other types of drum brake besides the brake described. They are extremely simple and economical to manufacture and assemble and comprise only a small number of parts which are all fitted in the space between the web of a shoe and the back-plate.

The advantage of making the ratchet teeth integral with the cam is that no relative angular movement can occur between the ratchet teeth and the cam which would destroy brake adjustment. Also fixing the cam member to its pivot pin allows close control over the frictional resistance to rotational movement of the cam member. Pressing the cam member from thin plate material is a most economical method of manufacturing the one-piece cam member. The particular advantage of the first embodiment is the compact arrangement.

The pawl lever of the second embodiment is positively driven in both directions and so does not require a spring.

I claim:

1. In an internal shoe-drum brake having arcuate shoes mounted on a stationary back-plate and adapted to be separated to bring them into engagement with a rotatable drum, an adjuster comprising a dished one-piece cam member having a base, a side-wall with a surface portion forming a cam surface adapted to bear on a shoe, and an outwardly directed flange extending from the side wall and formed with ratchet teeth; a pin extending through the base of the cam member for rotatably mounting the cam member on the back-plate adjacent the shoe; and a pawl movable with the shoe and co-operating with the ratchet teeth for rotating said cam member when relative movement between the shoe and said cam member exceeds a predetermined amount upon applying the shoe to the drum.

2. An adjuster as in claim 1 wherein said dished member is a pressing in plate material.

3. An adjuster as in claim 1 wherein said dished member is secured to the pin adapted to be rotatably mounted on the back-plate and a spring surrounds the pin and acts between the base of the dish and the back-plate.

4. An adjuster as in claim 3 wherein the cam surface co-operates with a second pin extending from the web of the shoe towards the back-plate so that the adjuster is contained in the space between the web and back-plate.

5. An adjuster as in claim 4 wherein the pawl is carried by a lever pivotally mounted on said second pin.

6. An adjuster as in claim 5 wherein the pawl is held in contact with the ratchet teeth by a spring looped around said second pin and acting between the lever and the rim of the shoe.

7. An adjuster as in claim 4 wherein the pawl is carried by a lever pivotally mounted on the back-plate of the brake and a third pin on the web of the shoe extends through a slot in the lever.

8. An adjuster as in claim 7 wherein the pawl lever is substantially L-shaped and is pivoted on the back-plate at a position towards the free end of the short arm, the slot being formed substantially at the junction of the two arms with its axis on the axis of the short arm.

* * * * *